United States Patent

Jang

(10) Patent No.: US 9,659,561 B2
(45) Date of Patent: May 23, 2017

(54) RECORDING SUPPORT ELECTRONIC DEVICE AND METHOD

(71) Applicant: Samsung Electronics Co., Ltd, Gyeonggi-do (KR)

(72) Inventor: Sung Woon Jang, Gyeonggi-do (KR)

(73) Assignee: SAMSUNG ELECTRONICS CO., LTD, Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/678,882

(22) Filed: Apr. 3, 2015

(65) Prior Publication Data

US 2015/0287409 A1 Oct. 8, 2015

(30) Foreign Application Priority Data

Apr. 4, 2014 (KR) .......................... 10-2014-0040342

(51) Int. Cl.
*G10L 15/26* (2006.01)
*G10L 15/00* (2013.01)
*G06F 17/28* (2006.01)
*G11B 27/031* (2006.01)

(52) U.S. Cl.
CPC ............ *G10L 15/26* (2013.01); *G06F 17/289* (2013.01); *G11B 27/031* (2013.01)

(58) Field of Classification Search
None
See application file for complete search history.

(56) References Cited

U.S. PATENT DOCUMENTS

| | | | |
|---|---|---|---|
| 7,778,632 B2* | 8/2010 | Kurlander | H04M 1/72566 348/61 |
| 8,010,368 B2* | 8/2011 | Yamaki | A61B 17/00 600/101 |
| 8,150,691 B2* | 4/2012 | Frimpong-Ansah | G11B 27/10 704/246 |
| 8,886,169 B2* | 11/2014 | Hussain | G10L 15/26 370/260 |
| 2008/0095331 A1* | 4/2008 | Wlasiuk | H04M 3/4938 379/88.14 |
| 2014/0019132 A1* | 1/2014 | Kuwabara | G10L 25/48 704/257 |
| 2014/0278408 A1* | 9/2014 | Park | G06F 3/0488 704/235 |
| 2014/0358536 A1* | 12/2014 | Choi | G10L 15/26 704/235 |
| 2015/0032450 A1* | 1/2015 | Hussain | G10L 15/26 704/235 |

(Continued)

FOREIGN PATENT DOCUMENTS

JP 2005-079852 A 3/2005
KR 1020040102380 A 12/2004

(Continued)

*Primary Examiner* — Satwant Singh

(57) ABSTRACT

A recording support method includes: receiving audio data; acquiring voice data from the audio data; receiving or generating text data corresponding to the voice data; storing at least part of the voice data and at least part of the text data corresponding to the at least part of the voice data; and output the received or generated text data, and wherein the stored at least part of the voice data and the stored at least part of the text data are associated each other, and wherein the at least part of voice data comprises one or more units.

17 Claims, 14 Drawing Sheets

(56) References Cited

U.S. PATENT DOCUMENTS

2015/0287409 A1* 10/2015 Jang ................... G10L 15/26
              704/235
2015/0334065 A1* 11/2015 Yan ................... H04M 1/72552
              709/206

FOREIGN PATENT DOCUMENTS

| KR | 1020060099589 A | 9/2006 |
| KR | 1020100093800 A | 8/2010 |
| KR | 1020120126649 A | 11/2012 |

* cited by examiner

RECORDING SUPPORT ELECTRONIC DEVICE AND METHOD

CROSS-REFERENCE TO RELATED APPLICATION AND CLAIM OF PRIORITY

The present application is related to and claims the benefit of priority under 37 U.S.C. §119(a) to Korean patent application No. 10-2014-0040342 filed on Apr. 4, 2014, the entire content of which is hereby incorporated by reference.

TECHNICAL FIELD

The present disclosure relates to a recording support electronic device and method for recording multimedia data including voice data.

BACKGROUND

When recording multimedia data with voice data, a typical electronic device may record a section from a time at which a recording start event occurs to a time at which a recording end event occurs.

As a section from a recording start time to a recording end time is recorded as one recording data during multimedia recording, when a user searches for a desired portion from the one recording data, checking undesired portions are required to find the desired portion.

SUMMARY

To address the above-discussed deficiencies, it is a primary object to provide a recording support electronic device and method for setting a recording start time and a recording end time based on a component of language, and recording, based on the setting, multimedia data including voice data that occurs during sound recording, video recording, voice call, and video call.

Various embodiments of the disclosure are directed to providing a recording support electronic device and method for recording multimedia data including voice data by a language component unit and converting the voice data into text data.

According to embodiments of the present disclosure, an electronic device includes: an audio processing unit configured to receive audio data, and to acquire voice data from the audio data; a control unit configured to receive or generate text data corresponding to the voice data, and to store at least part of the voice data and at least part of the text data corresponding to the at least part of the voice data, wherein the stored at least part of the voice data and the stored at least part of the text data are associated each other, and wherein the at least part of the voice data comprises one or more units; and a display unit configured to output the received or generated text data.

According to another embodiment of the present disclosure, a recording support method includes: receiving audio data; acquiring voice data from the audio data; receiving or generating text data corresponding to the voice data; storing at least part of the voice data and at least part of the text data corresponding to the at least part of the voice data; and output the received or generated text data, and wherein the stored at least part of the voice data and the stored at least part of the text data are associated each other, and wherein the at least part of voice data comprises one or more units.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
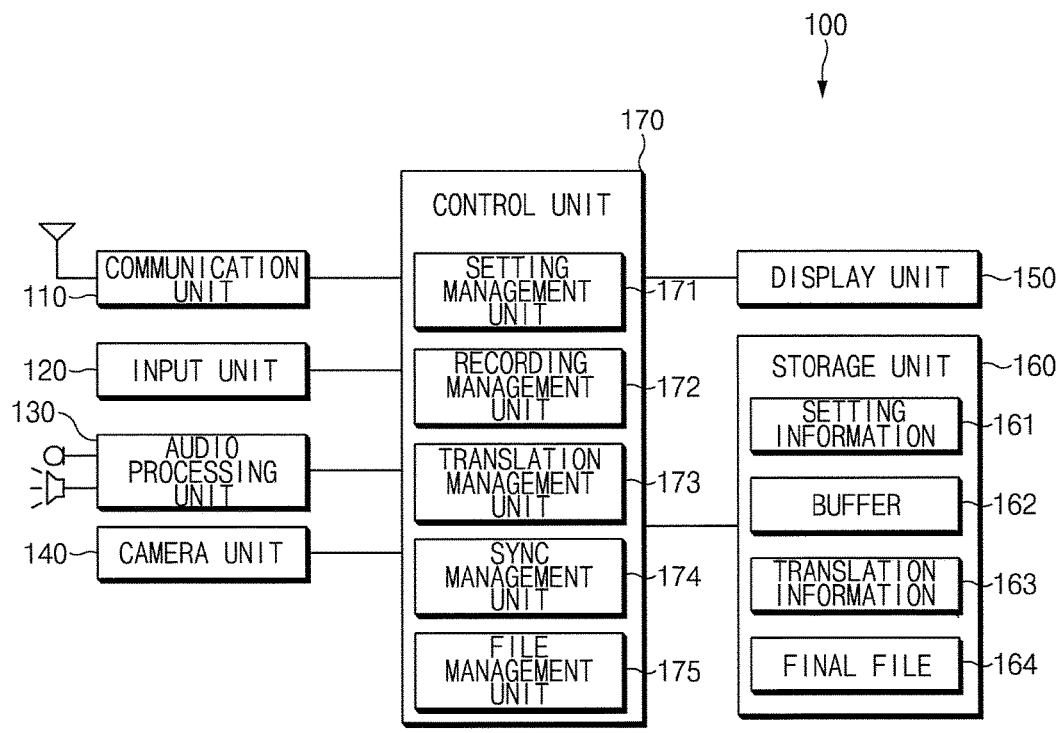
FIG. 1 illustrates a main configuration of a recording support electronic device according to various embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device.

The term "include," "comprise," and "have", or "may include," or "may comprise" and "may have" used herein indicates disclosed functions, operations, or existence of elements but does not exclude other functions, operations or elements. Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

The meaning of the term "or" used herein includes any or all combinations of the words connected by the term "or". For instance, the expression "A or B" may indicate include A, B, or both A and B.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). In contrast, when an element is referred to as being "directly connected" or "directly coupled" to another element, there are no intervening elements present.

Terms used in this specification are used to describe specific embodiments, and are not intended to limit the scope of the present disclosure. The terms of a singular form may include plural forms unless they have a clearly different meaning in the context.

Unless otherwise defined herein, all the terms used herein, which include technical or scientific terms, may have the same meaning that is generally understood by a person skilled in the art. It will be further understood that terms, which are defined in the dictionary and in commonly used, should also be translated as is customary in the relevant related art and not in an idealized or overly formal sense unless expressly so defined herein in various embodiments of the present disclosure.

An electronic device according to the present disclosure may be a device having a communication function. For example, an electronic device may be a wireless communication available device, for example, a smartphone, tablet personal computer (PC), mobile phone, personal digital assistant (PDA), MP3 player, wearable device (for example, head-mounted-device (HMD) such as electronic glasses), camera, or smart watch.

Hereinafter, an electronic device according to various embodiments of the present disclosure will be described in more detail with reference to the accompanying drawings. The term "user" in various embodiments may refer to a person using an electronic device or a device using an electronic device (for example, an artificial intelligence electronic device).

FIG. 1 illustrates a main configuration of a recording support electronic device according to various embodiments of the present disclosure.

Referring to FIG. 1, the electronic device 100 may include a communication unit 110, an input unit 120, an audio processing unit 130, a camera unit 140, a display unit 150, a storage unit 160, and a control unit 170.

The electronic device 100 obtains multimedia data including sound data and may record voice data for a first language checked from frequency information of the sound data. Once the electronic device 100 obtains multimedia data including sound data and video data, the electronic device 100 may record the voice data and the video data. The electronic device 100 may analyze the recorded voice data and may generate and output first text data for the first language. The electronic device 100 may translate the first text data into second text data for a second language and output the translated second text data.

Once multimedia data including sound data and video data is obtained, the electronic device 100 may output text data to video data as a subtitle. At this point, the multimedia data may be obtained during a voice call or a video call between the electronic device 100 and another electronic device (not shown). The electronic device 100 may obtain the multimedia data through video recording or sound recording for an external environment of the electronic device 100 or may obtain the multimedia data by receiving from an external device (another electronic device or a server device (not shown)). Voice data is classified as a voice from sound data and may be formed on the basis of a component of language. Although it is described that the voice data is formed by a sentence that is included in the component of language according to embodiments of the present disclosure, the present disclosure is not limited thereto. For example, the voice data may be formed by at least one of various components of language, such as syllables, morphemes, words, phrases, and verses.

The communication unit 110 may perform a communication between the electronic device 100 and an external device (for example, another electronic device (not shown)) to connect each other. For example, the communication unit 110 may communicate with an external device through wireless communication or wired communication. The wireless communication may include at least one of wireless fidelity (Wi-Fi), Bluetooth (BT), near field communication (NFC), or cellular communication (for example, LTE, LTE-A, CDMA, WCDMA, UMTS, WiBro, or GSM). The wired communication may include at least one of universal serial bus (USB), high definition multimedia interface (HDMI), recommended standard 232 (RS-232), or plain old telephone service (POTS), for example.

Additionally, the communication unit 110 may provide the communication unit 110 with voice calls, video calls, chatting messages, text message services, multimedia message services, or internet services by using the cellular communication. For example, the communication unit 110 may receive multimedia data from an external device through wireless communication or wired communication. The communication unit 110 may transmit at least one of sound data and video data included in the obtained multimedia data to an external device. The communication unit 110 may transmit, to an external device, first text data and second text data corresponding to voice data classified from the sound data.

The input unit 120 may generate an operation signal for operating the electronic device 100 in response to an input from the outside and may then provide the operation signal to the control unit 170. The input unit 120 may generate an enter signal for activating recording function in response to an input from the outside. The input unit 120 may generate a setting signal for setting whether to perform a translation in response to an input from the outside, a selection signal for selecting a section to be translated, and a storage signal for storing a translated final file. The input unit 120 may generate a playback signal for playing a stored final file. The input unit 120 may be an input device including a key button, a keyboard, a keypad, a touchpad, a touch screen, or an electronic pen.

The audio processing unit 130 may support an analog sound signal acquisition function and an analog sound signal output function. The audio processing unit 130 may include a microphone and a speaker. The audio processing unit 130 may obtain a sound signal and convert the obtained sound signal into sound data in Pulse Code Modulation (PCM) format. The audio processing unit 130 may collect a sound signal during a voice call or a video call or may collect a sound signal during sound recording via a microphone or video recording via the camera unit 140.

The audio processing unit 130 may analyze sound data and detect voice data from the sound data. The audio processing unit 130 may provide the detected voice data to the control unit 170. The audio processing unit 130 may analyze sound data to detect a portion where a specific waveform of a frequency is detected as voice data. The audio processing unit 130 may generate timestamp information when sound data is obtained.

The audio processing unit 130 may output an analog sound signal provided from the control unit 170 through a speaker.

The camera unit 140 may obtain video data for a specific subject in response to a control of the control unit 170 and provide the obtained video data to the control unit 170. The specific subject may be an object focused by the camera unit 140. The camera unit 140 may obtain video data for a user during a video call between the user and the other party. When recording of a video call or the video recording starts, timestamp information may be generated in the video data. The camera unit 140 may be installed or connected at the front and rear of the electronic device 100 and may include at least one image sensor (for example, a front sensor or a rear sensor), a lens (not shown), an image signal processor (ISP) (not shown), or a flash (not shown) (for example, an LED or a xenon lamp).

The display unit 150 may display an execution screen operating in response to a control of the control unit 170. For this, the display unit 150 may include a liquid crystal display (LCD) and a touch screen, and in the case of a touch screen, the display unit 150 may serve as the input unit 120 simultaneously. When the display unit 150 includes the touch screen, it may display an icon for activating recording function and a virtual button for setting whether to perform a translation. The display unit 150 may display a check box for selecting a section to be translated and a virtual button for storing a translation completed final file. The display unit 150 may display first text data and second text data corresponding to voice data in response to a control of the control unit 170.

The storage unit 160 may store programs or applications for operating the electronic device 100. Additionally, the storage unit 160 may include setting information 161 relating to translation setting and a buffer for storing multimedia data and timestamp information in real time temporarily or semi-permanently. Unit voice data may be stored in the buffer 162. The unit voice data may be data extracted from voice data on the basis of a component of language. For example, voice data may be formed on the basis of a sentence and also may be formed on the basis of at least one of various components of language, for example, syllables, morphemes, words, phrases, and verses. As the unit voice data is derived from multimedia data including sound data, it may include timestamp information.

The storage unit 160 may include translation information 163 for analyzing at least one unit voice data to generate first text data for a first language of voice data and also translating the first text data into a second language to generate second text data. After translation is completed, the storage unit 160 may include a final file 164 for storing a finally generated file as at least one data of unit voice data and video data synchronized with the unit voice data and at least one data of first text data and second text data.

The control unit 170 may check and record at least one unit voice data from voice data detected from the audio processing unit 130. The control unit 170 may generate at least one text data corresponding to the checked unit voice data. For this, the control unit 170 may include a setting management unit 171, a recording management unit 172, a translation management unit 173, a synch management unit 174, and a file management unit 175.

The setting management unit 171 may receive a setting signal relating to setting whether to perform translation on voice data, from the input unit 120. The setting management unit 171 may set whether to translate voice data in response to the setting signal and may store it in the setting information 161. At this point, the setting signal may be for setting whether to translate entire voice data received through the audio processing unit 130 in real time or setting whether to translate only unit voice data selected by a user.

The recording management unit 172 may receive an enter signal for activating a recording function from the input unit 120. The recording management unit 172 may record a voice or video call, multimedia data received from an external device, or multimedia data for an external environment of the electronic device 100 in response to the enter signal.

The recording management unit 172 may record entire voice data detected from the audio processing unit 130 or may check and record at least one unit voice data from voice data. The unit voice data may be formed on the basis of a component of language. For example, unit voice data may be formed on the basis of a sentence and also may be formed on the basis of at least one of various components of language, for example, syllables, morphemes, words, phrases, and verses. The recording management unit 172 may check and record a section from a time at which voice data is checked to a time at which the voice data is terminated in the detected voice data by unit voice data. At this point, the recording management unit 172 may check and record a section from a threshold time before a time at which voice data is checked to a threshold time after a time at which the voice data is terminated by unit voice data. As unit voice data is data checked from voice data detected from sound data, the start and end time of the unit voice data may be checked from timestamp information in the sound data.

The recoding management unit 172 may store unit voice data and video data in the buffer 162 in real time temporarily or semi-permanently according to the type of recorded multimedia data. The recoding management unit 172 may provide unit voice data to the translation management unit 173.

The translation management unit 173 may perform a translation on at least one unit voice data stored in the buffer 162 by referring to the translation information 163. At this point, the translation management unit 173 may generate first text data by using unit voice data. The translation management unit 173 may generate the first text data as second text data for another language to perform a translation on unit voice data. At this point, the translation management unit 173 may reflect timestamp information corresponding to unit voice data on first and second text data. The translation management unit 173 may provide the unit voice data and the first text data and second text data to the sync management unit 174. The translation management unit 173 may translate entire unit voice data received from the recording management unit 172 or selected unit voice data in responding to a setting signal. The translation management unit 173 may translate unit voice data by a sentence or may translate unit voice data by at least one unit of syllables, morphemes, words, phrases, and verses according to the type of language.

The sync management unit 174 may synchronize each data by checking the timestamp information of the unit voice data and the first and second text data, which are provided from the translation management unit 173. When the unit voice data is included in video data, the sync management unit 174 performs a synchronization by checking the timestamp of the video data and the unit voice data, and then may synchronize the first text data and the second text data. When the synchronization is completed, the sync management unit 174 may provide the data to the file management unit 175. At this point, when data to be synchronized is video data and voice data obtained during a video call, the sync management unit 174 may check video data stored in the buffer 162. When the other party video and a user video are stored in the buffer 162 as one video data, the sync management unit 174 may synchronize video data and unit voice data, and may then synchronize with the first text data and the second text data. When each of the other party video and a user video is stored in the buffer 162 as respective video data, the sync management unit 174 may synchronize each video data and unit voice data, and may then synchronize with the first text data and the second text data.

When recording on unit voice data during sound recording or a voice call is performed in the recording management unit 172, the file management unit 175 may generate at least one text data of the unit voice data and the first and second text data as one file. Additionally, when video data is recorded and unit voice data is recorded during video recording or a video call, the file management unit 175 may generate the video data and the unit voice data synchronized with at least one text data of the first and second text data as one file. The file management unit 175 may store the generated file in a final file 164.

When the input unit 120 receives a playback signal for playing a file stored in the final file 164, the file management unit 174 may extract a file corresponding to the playback signal and output the file through a speaker of the audio processing unit 130. When the file corresponding to the playback signal is a file generated through sound recording and voice call recording, the file management unit 175 may output one text data of the unit voice data and the first and second text data through the speaker and the display unit 150 of the audio processing unit 130. When the file corresponding to the playback signal is a final file generated through video recording and video call recording, the file management unit 175 may output a video file through the speaker and the display unit 150 of the audio processing unit 130.

Figure 2:
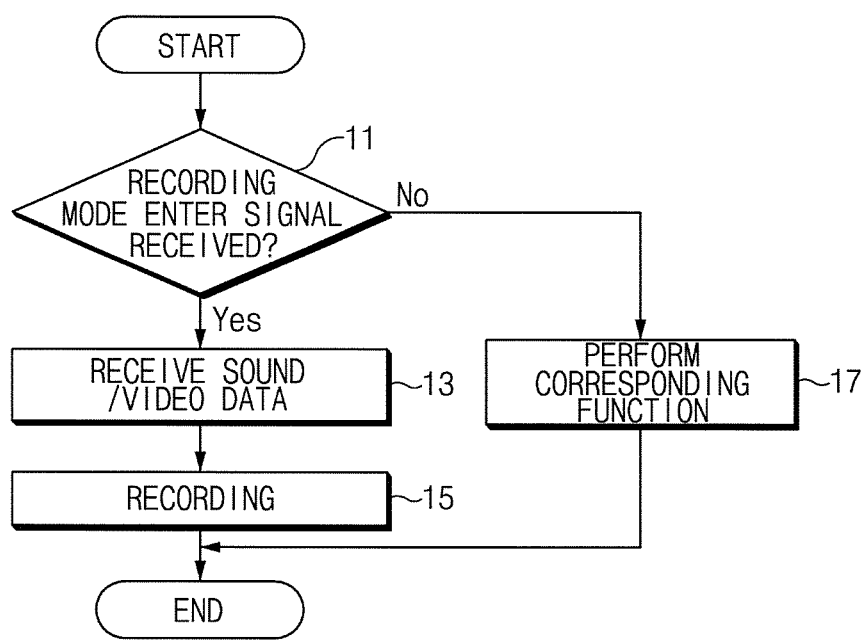
FIG. 2 illustrates a method of recording unit voice data according to various embodiments of the present disclosure.

FIG. 2 illustrates a method of recording unit voice data according to various embodiments of the present disclosure.

Referring to FIGS. 1 and 2, on the receipt of an enter signal to a recording function from the input unit 120 in operation 11, the control unit 170 may perform operation 13. When not receiving the enter signal to the recording function, the control unit 170 may perform operation 17 to maintain a standby state or may perform a function in execution continuously.

In operation 13, the control unit 170 may receive voice data from the audio processing unit 130. The audio processing unit 130 may analyze sound data obtained from a microphone to detect as voice data a portion where a specific waveform of a frequency is detected. At this point, the sound data may be obtained from a microphone during sound recording or a voice call, or may be obtained from the microphone during video recording or video call. During video recording or a video call, the control unit 170 may receive voice data and may receive video data obtained from the camera unit 140.

In operation 15, the control unit 170 may perform recording in real time by checking at least one unit voice data from the received voice data. At this point, the recording may mean that the control unit 170 may store unit voice data or video data in the storage unit 160 temporarily or semi-permanently.

The control unit 170 may check at least one unit voice data from the voice data. The unit voice data may be formed on the basis of a component of language. For example, unit voice data may be formed on the basis of a sentence and also may be formed on the basis of at least one of various components of language, for example, syllables, morphemes, words, phrases, and verses. The control unit 170 may check and record a section from a time at which voice data is checked to a time at which the voice data is terminated in the detected voice data as unit voice data. At this point, the control unit 170 may check and record a section from a threshold time before a time at which voice data is checked to a threshold time after a time at which the voice data is terminated as unit voice data. As unit voice data is data checked from voice data detected from sound data, the start and end time of the unit voice data may be checked from timestamp information in the sound data. Furthermore, when video recording of video call recording starts, timestamp information may be generated in the video data.

Figure 3:
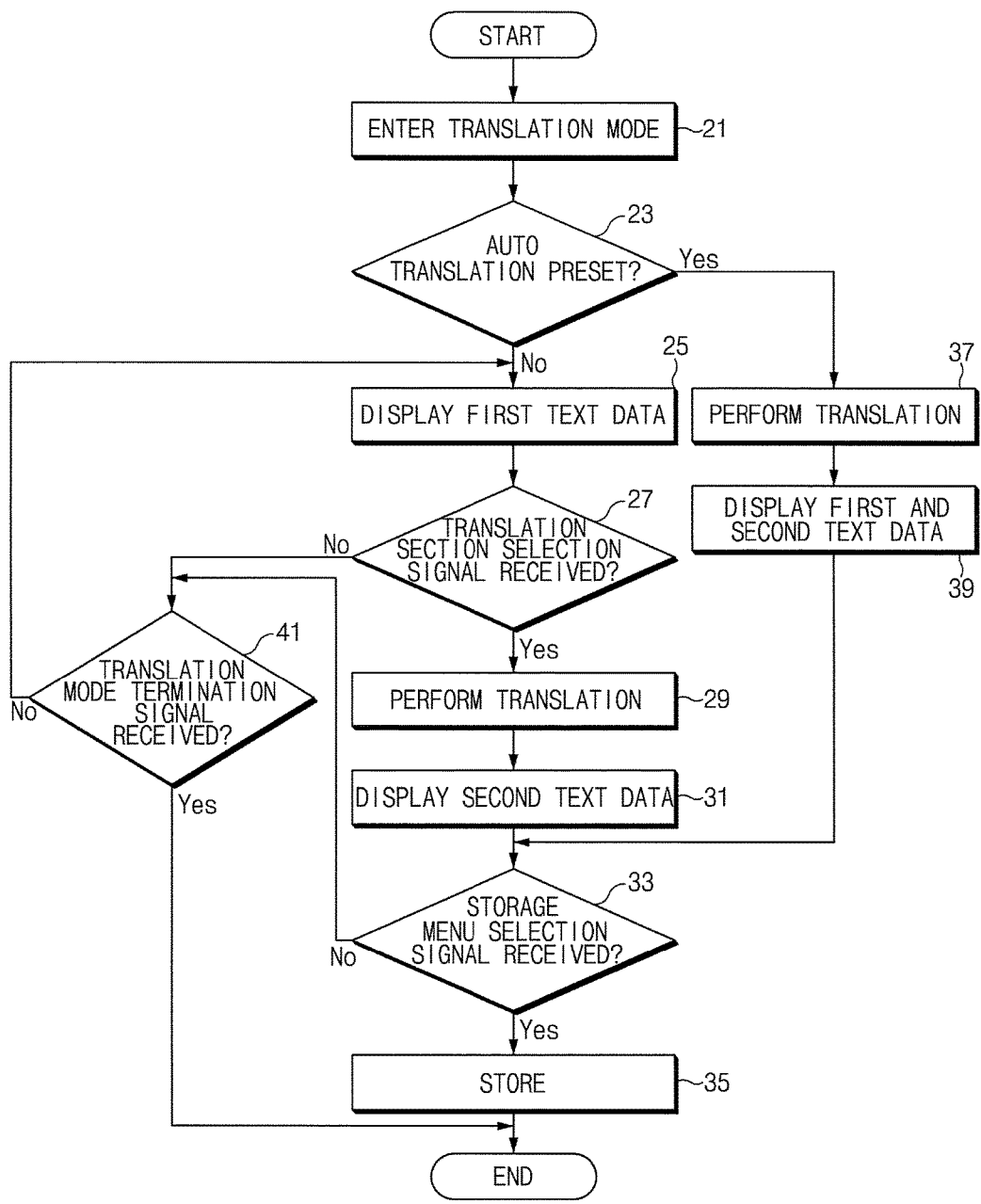
FIG. 3 illustrates a method of translating unit voice data according to various embodiments of the present disclosure.

FIG. 3 illustrates a method of translating unit voice data according to various embodiments of the present disclosure.

Referring to FIGS. 1 and 3, in operation 21, the control unit 170 may perform a translation mode for translating the unit voice data stored in the storage unit 160 in real time in operation 15 of FIG. 2. In operation 23, the control unit 170 may check whether the translation setting of the unit voice data is a real time auto setting. On the basis of a check result, when the translation setting of the unit voice data is the real time auto setting, the control unit 170 may perform operation 37 to translate the unit voice data being stored in real time.

In operation 37, the control unit 170 may translate unit voice data formed in a first language to generate first text data. The control unit 170 may generate second text data of a second language by using the generated first text data to translate the unit voice data. The control unit 170 may perform operation 39 to display first and text data on the display unit 150. The control unit 170 may display only the first text data or the second text data on the display unit 150. The control unit 150 may display text data on the display unit 150 and may then perform operation 33.

Additionally, in operation 39, when the data obtained in FIG. 2 is video data including unit voice data, the control unit 170 displays the video data on the display unit 150 and translates the unit voice data to display at least one text data of the first text data and the second text data to be overlaid on the video data. The control unit 150 may display text data on the display unit 150 and may then perform operation 33.

If the unit voice data is not in the real time auto translation setting state, the control unit 170 may perform operation 25. In operation 25, the control unit 170 may translate unit voice data formed in a first language to generate first text data. The control unit 170 may display the generated first text data on the display unit 150. If not receiving a translation section selection signal for translation from the input unit 120 in operation 27, the control unit 170 may perform operation 41. If receiving a termination signal for terminating a translation mode from the input unit 1201 in operation 41, the control unit 170 may terminate the translation mode. If not receiving the termination signal for terminating the translation mode from the input unit 1201 in operation 41, the control unit 170 may return to operation 25 and may perform the above operations again.

If receiving the translation section selection signal for translation from the input unit 120 in operation 27, the control unit 170 may perform operation 29. In operation 29, the control unit 170 may translate unit voice data corresponding to a selection signal. The control unit 170 may generate second text data of a second language by using the first text data displayed on the display unit 150 to translate the unit voice data in operation 25.

Additionally, when the obtained data is video data including sound data, the control unit 170 may display the video data on the display unit 150. The control unit 170 may generate first text data by using the unit voice data in the sound data and also may generate second text data by using the first text data. The control unit 170 may synchronize the video data and the unit voice data to display the synchronized data on the display unit 150. The control unit 170 may display at least one text data of the first text data and the second text data to be overlaid on the video data or may divide the display unit 150 to display the at least one text data in an area separated from an area where the video data is displayed. Then, the control unit 170 may perform operation 33.

Upon the receipt of a storage menu selection signal from the input unit 120 in operation 33, the control unit 170 may perform operation 35. In operation 35, the control unit 170 may generate a final file by synchronizing the unit voice data corresponding to the selection signal, the first text data, and the second text data to store the final file in the storage unit 160. Additionally, the control unit 170 may check timestamp information included in the video data and the unit voice data. The control unit 170 may generate a final file by synchronizing the video data, the unit voice data, the first text data, and the second text data to store the final file in the storage unit 160. On the other hand, when not receiving the storage menu selection signal from the input unit 120 in operation 33, the control unit 170 may perform operation 41. While executing the final file stored in operation 35, the control unit 170 may output at least one data of the unit voice data and the video data and at least one text data of the first text data and the second text data at the same time according to the type of the stored final file.

FIGS. 4a-4d illustrate a screen view of a method of translating unit voice data according to various embodiments of the present disclosure.

Figure 4A:
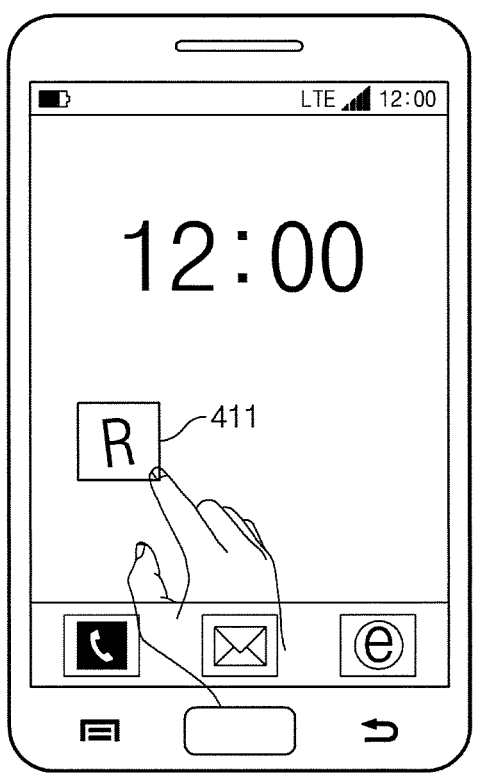
FIGS. 4a-4d illustrate a screen view of a method of translating unit voice data according to various embodiments of the present disclosure.
Figure 4B:
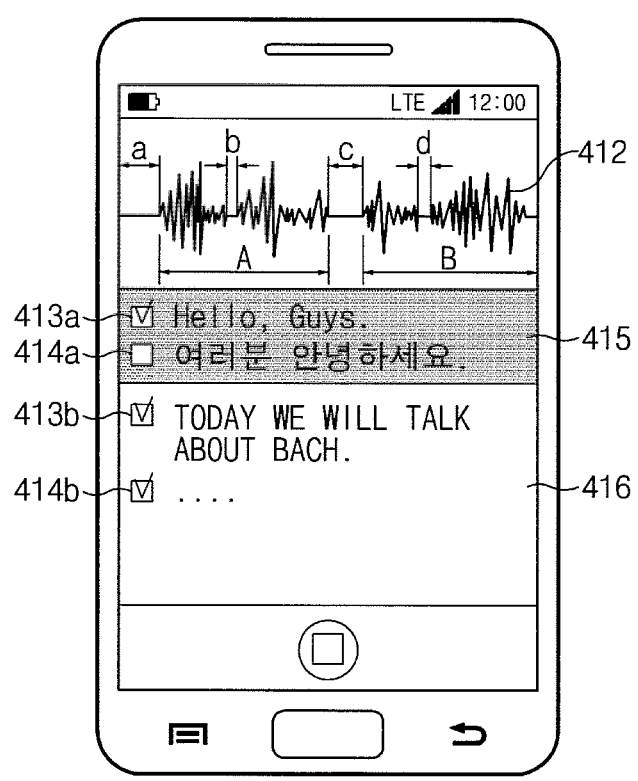

Referring to FIGS. 1 and 4a-4d, as shown in FIG. 4a, a user of an electronic device 100 selects an icon 411 for recording voice data, a microphone may be activated to collect an analog sound signal for user's voice. The collected analog sound signal is converted into sound data in PCM format to be displayed on the display unit 150 as shown in frequency information 412 of FIG. 4b. Frequency information 412 of voice data classified from the sound data is shown in FIG. 4b. In the frequency information 412, areas corresponding to a, b, c, and d may be sections where no voice data is checked or only noise exists.

The electronic device 100 may obtain as unit voice data a section from a time at which the frequency information has a specific waveform to a time at which the frequency information does not have a specific waveform. The electronic device 100 may check at least one unit voice data from the voice data after the voice data is detected from the sound data. The unit voice data may be formed of a sentence A or B including at least one phrase. The specific waveform may not be checked during a threshold time c between the sentence A and the sentence B. At this point, area b may be a section between <hello> and <guys> and area d may be a section between <today> and <we>. Areas b and d may represent sections where making a voice stops temporarily between components forming a sentence, for example, between a phrase and a phrase or between a word and a word.

When a real time auto translation of unit voice data is not set, the electronic device 100 may convert the unit voice data A and B into the first text data in real time as shown in FIG. 4b to display the converted first text data on the display unit 150 sequentially. At this point, the control unit 170 may display check boxes 413a, 414a, 413b, and 414b. At this point, 413a and 413b may be check boxes for generating a selection signal for translating the first text data into the second text data and 414a and 414b may be check boxes for storing a final file corresponding to the selected section.

When a user selects 413a after the first text data <hello, guys> in English is displayed on the display unit 150, the control unit 170 generates second text data of a second language by using the first text data corresponding to <hello, guys> in English to display <hello, guys> in Korean on the display unit 150. At this point, when the generation of the second text data is completed and displayed on the display unit 150, the control unit 170 may change the colors of areas where the first and second text data are displayed as shown in 415. After first text data <today we will talk about Bach> in English is displayed on the display unit 150, when a user selects 413b, the control unit 170 may generate the first text data as second text data. When the generation of the second text data is not completed, an ellipsis notifying that the first text data is being translated to the second text data as shown in 416 may be displayed on the display unit 150. Once the translation is completed, the control unit 170 may display the second text data below <today we will talk about Bach> in English and may change the color of 416. When a user selects 414b, the control unit 170 may generate as a final file the unit voice data, the first text data, and the second text data corresponding to <today we will talk about Bach> and may then store the final file. At this point, the control unit 170 may generate as a final file only the unit voice data and the first text data or may generate as a final file only the unit voice data and the second text data according to a user's selection.

Figure 4C:
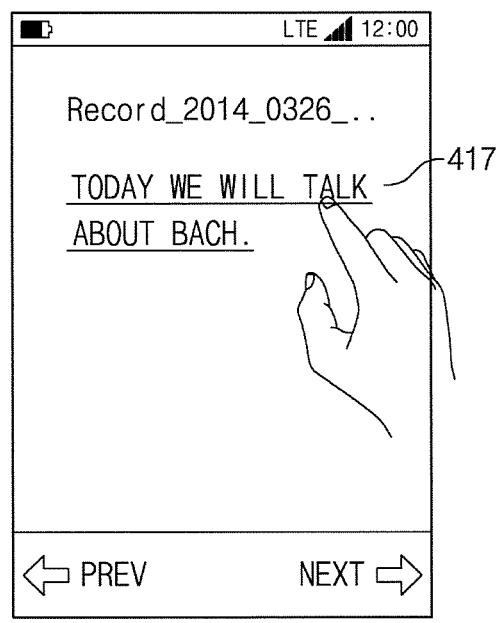
Figure 4D:

After the final file is generated completely, when a user performs a menu selection or an icon selection for checking the final file, a list of stored final files is displayed on the display unit 150 as shown in FIG. 4c. The final file list may be displayed in the format of the first text data. The stored final files may be final files for a section where a selection signal is provided to 414a and 414b of FIG. 4b. When a user selects one item from the final file list as shown in 417 of FIG. 4c, the display unit 150 may display a screen as shown in FIG. 4d The second text data corresponding to the first text data selected by a user may be displayed as shown in 418 and the unit voice data corresponding to the first text data may be outputted. When a user selects 419 in FIG. 4d, the electronic device 100 may convert the second text data into Text To Speech (TTS) and output the TTS.

According to embodiments of the present disclosure, although it is described that when a check box for translation is selected in FIG. 4b, the first text data is translated into the second text data, the present disclosure is not limited thereto. According to embodiments of the present disclosure, when first text data for one item is selected from the stored final file as shown in FIG. 4c, second text data is generated to be displayed on the display unit 150 as shown in FIG. 4d.

Figure 5A:
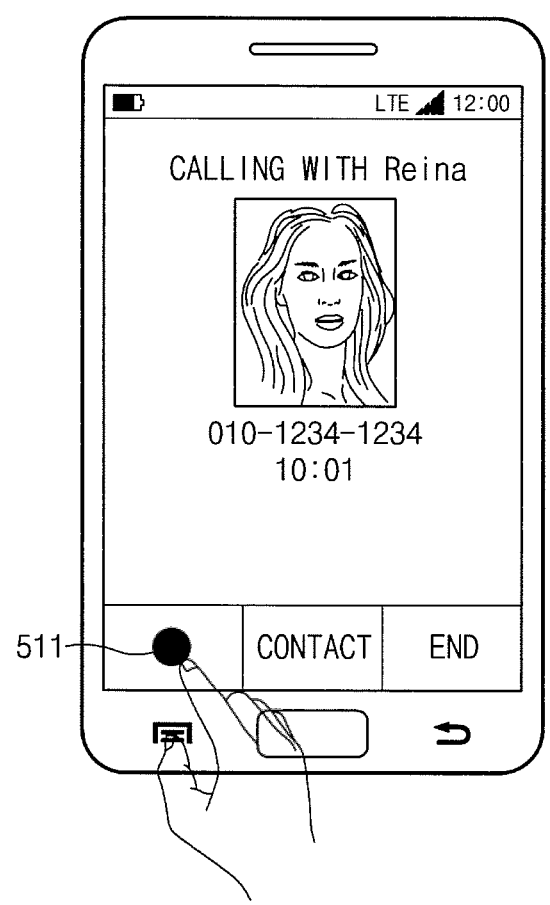
FIGS. 5a-5b illustrate a screen view of a method of translating unit voice data during a voice call according to various embodiments of the present disclosure.
Figure 5B:
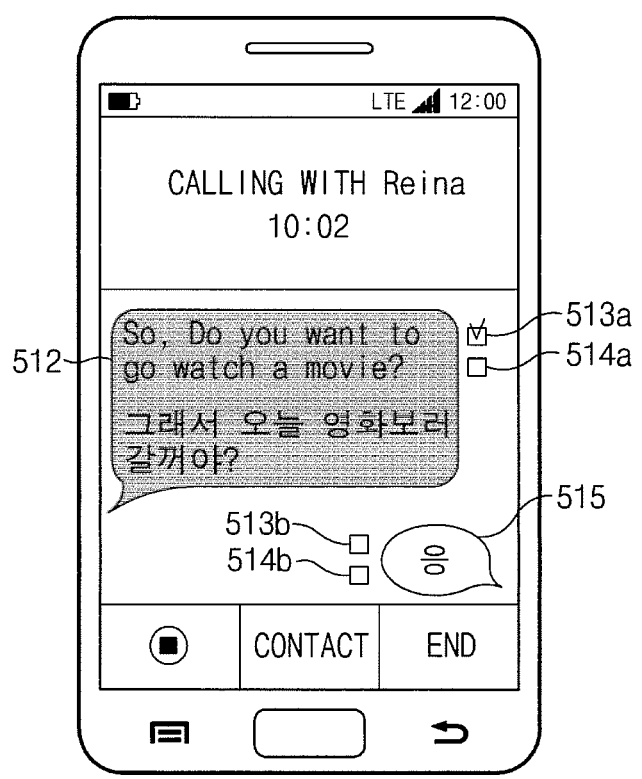

FIGS. 5a-5b illustrates a screen view of a method of translating unit voice data during a voice call according to various embodiments of the present disclosure.

Referring to FIGS. 1, 4a-4d, and 5a-5b, when a user selects a recording button corresponding to 511 during a voice call with the other party as shown in FIG. 5a, the electronic device 100 may record voice data detected from sound data corresponding to a call content in real time. The electronic device 100 may record voice data detected from sound data transmitted through the communication unit 110 in real time. The electronic device 100 may detect voice data from sound data and may extract at least one unit voice data from the detected voice data. The extracted unit voice data may be displayed as first text data as shown in 512 and 515 of FIG. 5b.

When a real time auto translation of unit voice data is not set, the electronic device 100 may convert the unit voice data into the first text data in real time as shown in FIG. 5b to display the converted first text data on the display unit 150 sequentially. At this point, the control unit 170 may display check boxes 513a, 513b, 514a, and 514b on the first text data. At this point, 513a and 513b may be check boxes for generating a selection signal for translating the first text data into the second text data and 514a and 514b may be check boxes for storing a final file corresponding to the selected section.

When a user selects 513a after the first text data <So, Do you want to go watch a movie?> in English is displayed on the display unit 1510, the control unit 170 generates second text data by using the first text data <So, Do you want to go watch a movie?> in English so as to display <So, Do you want to go watch a movie?> in Korean on the display unit 150. At this point, when the generation completed second text data is displayed on the display unit 150, the control unit 170 may change the colors of areas where the first and second text data are displayed as shown in 512. At this point, when a user selects 414b, the control unit 100 may generate as a final file the unit voice data, the first text data, and the second text data corresponding to <So, Do you want to go watch a movie?> in English and may then store the final file. The electronic device 100 may perform a synchronization with the first text data and the second text data by checking the timestamp of the unit voice data during the final file generation. At this point, when the unit voice data is converted to generate the first text data, the electronic device 100 may check the timestamp of the unit voice data to generate a timestamp on the first text data. When the first text data is converted into the second text data, a timestamp generated in the first text data may be generated as a timestamp in the second text data. The electronic device 100 may perform a synchronization by using the timestamps of the unit voice data, the first text data, and the second text data.

Then, when a user does not select 513a after the first text data <yes> in Korean is displayed on the display unit 150, the electronic device 100 may display only the first text data except for the second text data on the display unit 150. As a method of selecting and checking a stored final file is described with reference to FIGS. 4c and 4d, its detailed description is omitted. In such a way, embodiments of the present disclosure perform a translation on the other party's voice during a call with the other party using a different language so that the progress of a conversation may be performed smoothly. Additionally, embodiments of the present disclosure perform a recording by a sentence unit and separately translates a desired portion in a recording file, so that user's convenience may be improved. Although the present disclosure describes a technique for 1:1 voice call, this disclosure is not limited thereto. That is, the present disclosure may be applied to a situation in which users using various languages perform audio conferencing.

Figure 6A:
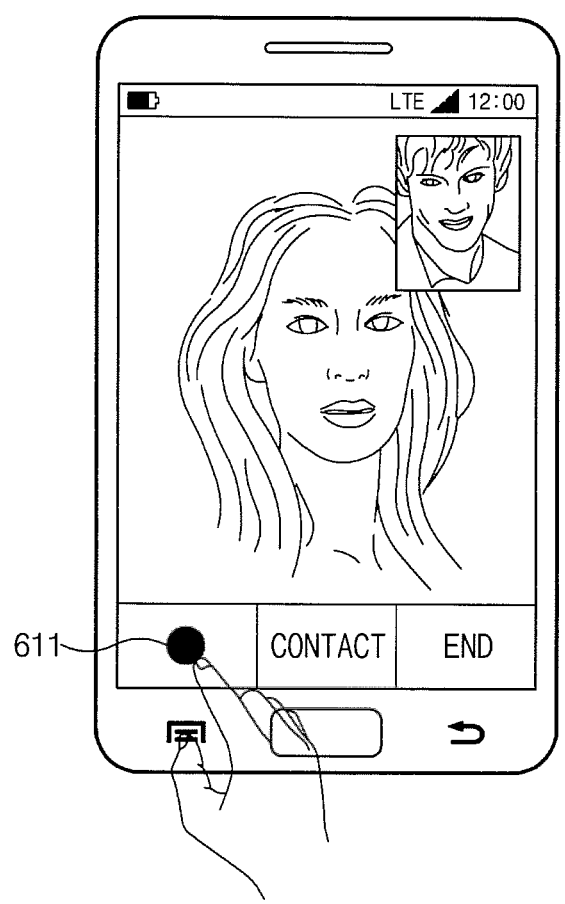
FIGS. 6a-6b illustrate a screen view of a method of translating unit voice data during a video call according to various embodiments of the present disclosure.
Figure 6B:
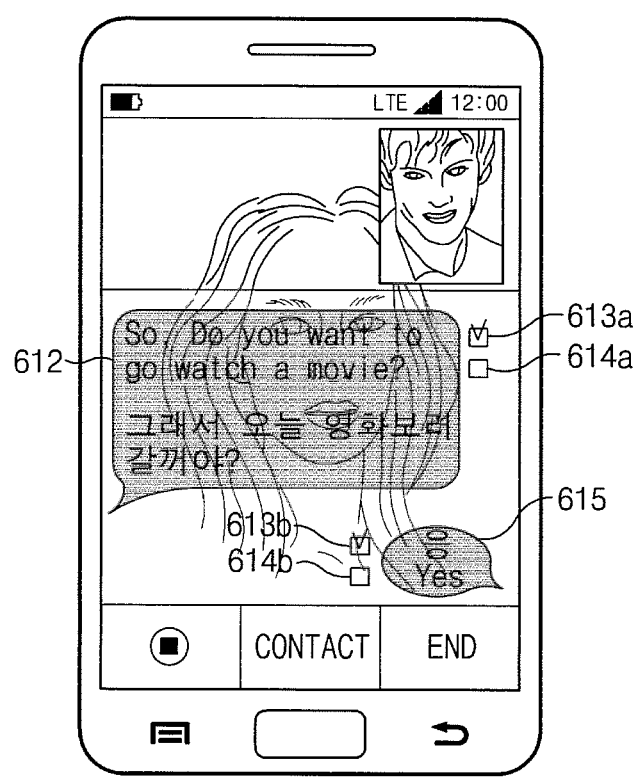

FIGS. 6a-6b illustrate a screen view of a method of translating unit voice data during a video call according to various embodiments of the present disclosure.

Referring to FIGS. 1, 4a-4d, and 6a-6b, when a user selects a recording button corresponding to 611 during a video call with the other party as shown in FIG. 6a, the electronic device 100 may record video data corresponding to a call content and voice data detected from sound data in real time. At this point, the electronic device 100 may record video data transmitted through the communication unit 110 and voice data detected from sound data in real time. The electronic device 100 may extract unit voice data from the extracted voice data from the sound data. The electronic device 100 may record user's image data and the other party's image data displayed as shown in FIG. 6a as one video data or may record them as each video data. The extracted unit voice data may be displayed as shown in 612 and 615 of FIG. 6b and video data on a user and the other party during a call may be continuously outputted to the display unit 150 as shown in FIG. 6b.

When a real time auto translation of unit voice data is not set, the electronic device 100 may convert the unit voice data into the first text data in real time as shown in FIG. 6b to display the converted first text data on the display unit 150 sequentially. At this point, the control unit 170 may display check boxes 613a, 613b, 614a, and 614b on the first text data. At this point, 613a and 613b may be check boxes for generating a selection signal for translating the first text data into the second text data and 613a and 613b may be check boxes for storing a final file corresponding to the selected section.

As the description for 612 is similar to the description for 512 of FIG. 5b, its detailed description is omitted. After first text data <So, Do you want to go watch a movie?> is displayed, first text data <yes> may be displayed on the display unit 150. At this point, when a user selects 613a, the control unit 170 may generate second text data by using the first text data <yes> in Korean to display <yes> in English on the display unit 150. When the generation completed second text data is displayed on the display unit 150, the control unit 170 may change the colors of areas where the first and second text data are displayed as shown in 615. At this point, when a user selects 613b, the electronic device 100 may generate as a final file the unit voice data, the video data, the first text data, and the second text data corresponding to <yes> and may then store the final file. The electronic device 100 may perform a synchronization with the first text data and the second text data by checking the timestamp of the unit voice data and the vide data during the final file generation. As a method of selecting and checking a stored final file is described with reference to FIGS. 4c and 4d, its detailed description is omitted. The present disclosure performs a translation on the other party's voice during a call with the other party using a different language so that the progress of a conversation may be performed smoothly. Additionally, the present disclosure performs a recording by a sentence unit and separately translates a desired portion in a recording file, so that user's convenience may be improved. Although the present disclosure describes a technique for 1:1 voice call, it is not limited thereto. That is, the present disclosure may be applied to a situation in which users using various languages perform video conferencing.

Figure 7A:
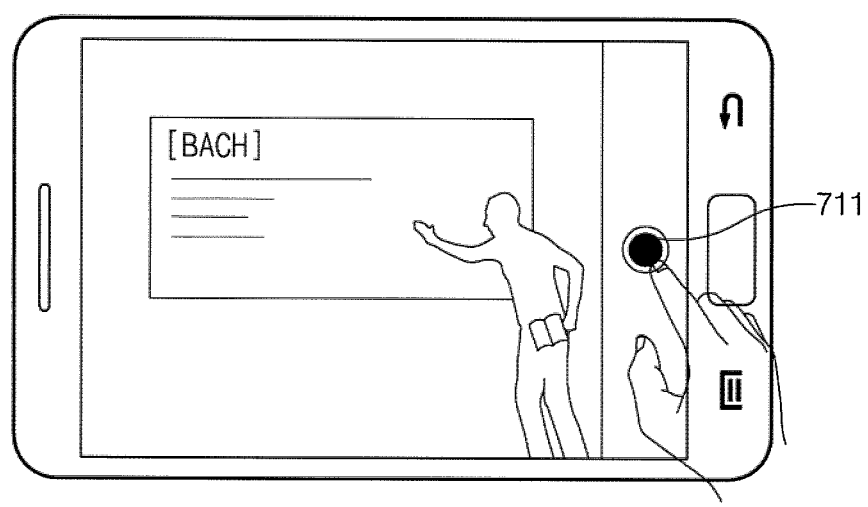
FIGS. 7a-7b illustrate a screen view of a method of translating unit voice data during video recording according to various embodiments of the present disclosure.
Figure 7B:
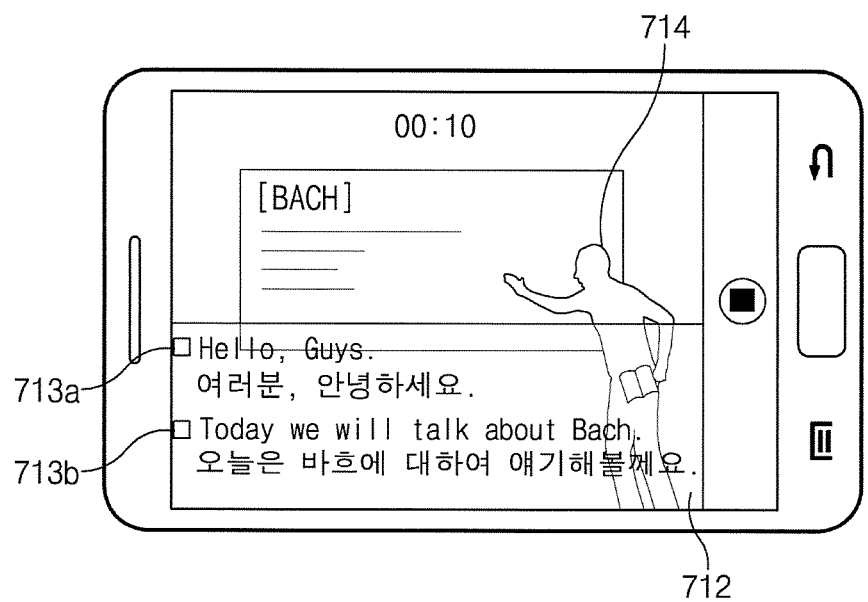

FIGS. 7a-7b illustrate a screen view of a method of translating unit voice data during video recording according to various embodiments of the present disclosure.

Referring to FIGS. 1, 4a-4d, and 7a-7b, when a user selects a recording button corresponding to 711 as shown in FIG. 7a, the electronic device 100 may record video data and voice data detected from sound data in real time through the camera unit 150 and a microphone. At this point, although the video data and the sound data are obtained respectively through the camera 140 and the microphone, they may be received from another electronic device or a service device through the communication unit 110.

The electronic device 100 may detect voice data from sound data and may extract at least one unit voice data from the detected voice data. The electronic device 100 may analyze the unit voice data to display first text data as shown in 712 of FIG. 7b. The electronic device 100 may generate second text data for a second language by using the first text data to display the second text data.

When a real time auto translation of unit voice data is set, the electronic device 100 may display the first text data and the second text data as shown in FIG. 7b without a selection signal for translation from a user. For example, a speaker 714 that is a target of recording may make a voice <hello, guys> and <today we will talk about Bach>. At this point, the electronic device 100 may analyze unit voice data obtained from the voice to generate first text data. The electronic device 100 may translate the generated first text data to generate second text data and may display the generated second text data on the display unit 150.

When a user selects 713a and 713b, the electronic device 100 may store a selected section. At this point, the electronic device 100 may generate as a final file the unit voice data, the video data, the first text data, and the second text data corresponding to <hello, guys> and <today we will talk about Bach> and may then store the final file. The electronic device 100 may perform a synchronization with the first text data and the second text data by checking the timestamp of the unit voice data and the vide data during the final file generation. As a method of selecting and checking a stored final file is described with reference to FIGS. 4c and 4d, its detailed description is omitted. The present disclosure may generate text data corresponding to unit voice data from video data including voice data, for example, lectures, films, and videos, and may then synchronize the unit voice data and the text data with the video data to easily generate a subtitle.

Figure 8:
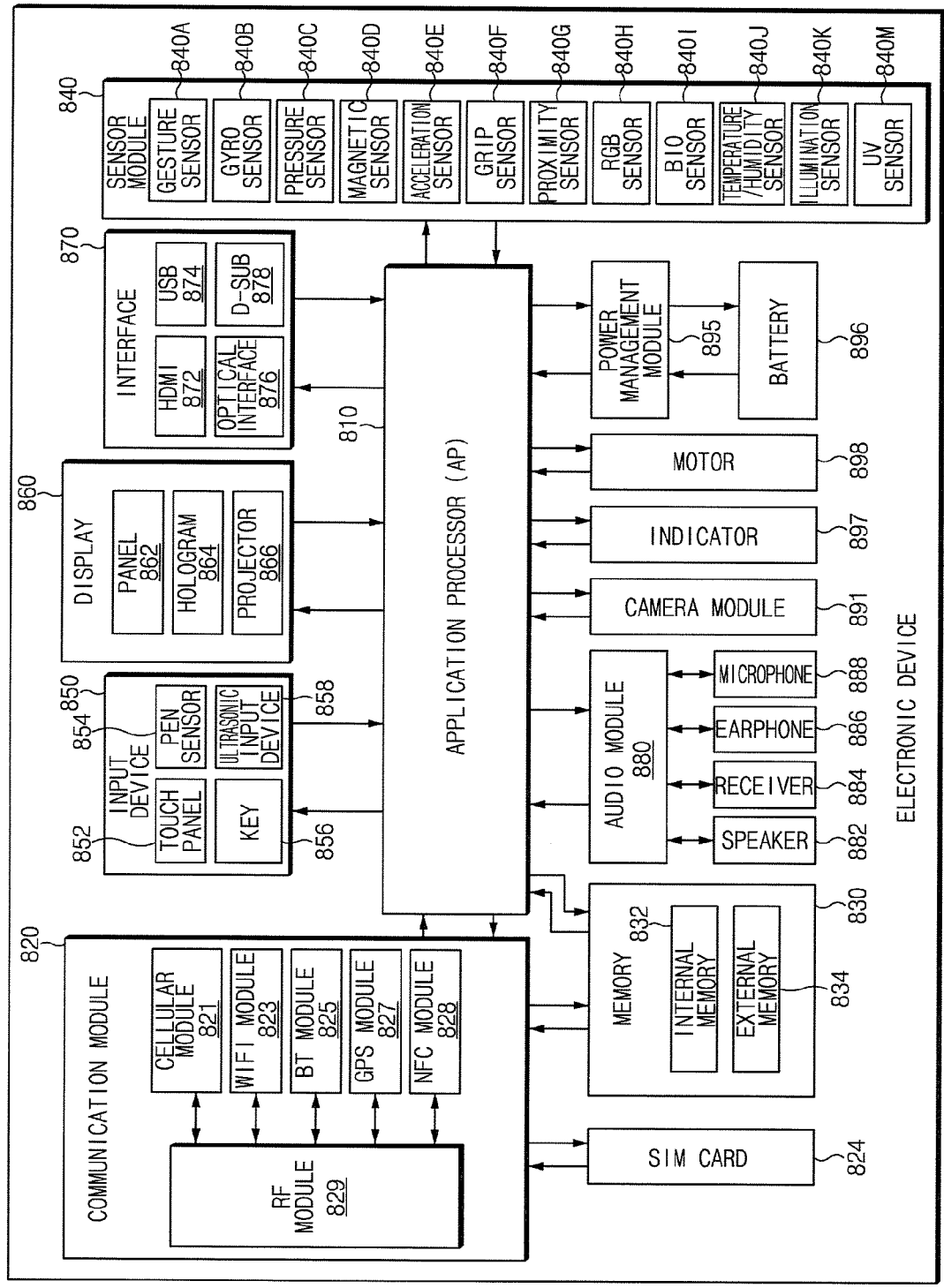
FIG. 8 illustrates an electronic device according to various embodiments of the present disclosure.

FIG. 8 illustrates an electronic device according to various embodiments of the present disclosure.

Referring to FIG. 8, an electronic device 800, for example, may configure all or part of the above-mentioned electronic device 100 shown in FIG. 1. The electronic device 800 includes at least one application processor (AP) 810, a communication module 820, a subscriber identification module (SIM) card 824, a memory 830, a sensor module 840, an input device 850, a display 860, an interface 870, an audio module 880, a camera module 891, a power management module 895, a battery 896, an indicator 897, and a motor 898.

The AP 810, for example, the control unit 170 shown in FIG. 1, may control a plurality of hardware or software components connected to the AP 810 and also may perform various data processing and operations with multimedia data by executing an operating system or an application program. The AP 810 may be implemented with a system on chip (SoC), for example. According to embodiments of the present disclosure, the AP 810 may further include a graphic processing unit (GPU) (not shown).

The communication module 820, for example, the communication unit 110 shown in FIG. 1, may perform data transmission in a communication between the electronic device 800 (for example, the electronic device 100) and other electronic devices connected via a network. According to embodiments of the present disclosure, the communication module 820 may include a cellular module 821, a Wifi module 823, a BT module 825, a GPS module 827, an NFC module 828, and a radio frequency (RF) module 829.

The cellular module 821 may provide voice calls, video calls, text services, or internet services through a communication network (for example, LTE, LTE-A, CDMA, WCDMA, UMTS, WiBro, or GSM). The cellular module 821 may perform a distinction and authentication operation on an electronic device in a communication network by using a subscriber identification module (for example, the SIM card 824), for example. According to embodiments of the present disclosure, the cellular module 821 may perform at least part of a function that the AP 810 provides. For example, the cellular module 821 may perform at least part of a multimedia control function.

According to embodiments of the present disclosure, the cellular module 821 may further include a communication processor (CP). Additionally, the cellular module 821 may be implemented with SoC, for example. As shown in FIG. 8, components such as the cellular module 821 (for example, a CP), the memory 830, or the power management module 895 are separated from the AP 810, but according to embodiments of the present disclosure, the AP 810 may be implemented including some of the above-mentioned components (for example, the cellular module 821).

According to embodiments of the present disclosure, the AP 810 or the cellular module 821 (for example, a CP) may load instructions or data, which are received from a nonvolatile memory or at least one of other components connected thereto, into a volatile memory and then may process them. Furthermore, the AP 810 or the cellular module 821 may store data received from or generated by at least one of other components in a nonvolatile memory.

Each of the Wifi module 823, the BT module 825, the GPS module 827, and the NFC module 828 may include a processor for processing data transmitted/received through a corresponding module. Although the cellular module 821, the Wifi module 823, the BT module 825, the GPS module 827, and the NFC module 828 are shown as separate blocks in FIG. 8, according to embodiments of the present disclosure, some (for example, at least two) of the cellular module 821, the Wifi module 823, the BT module 825, the GPS module 827, and the NFC module 828 may be included in one integrated chip (IC) or an IC package. For example, at least some (for example, a CP corresponding to the cellular module 821 and a Wifi processor corresponding to the Wifi module 823) of the cellular module 825, the Wifi module 827, the BT module 828, the GPS module 821, and the NFC module 823 may be implemented with one SoC.

The RF module 829 may be responsible for data transmission, for example, the transmission of an RF signal. Although not shown in the drawings, the RF module 829 may include a transceiver, a power amp module (PAM), a frequency filter, or a low noise amplifier (LNA). Additionally, the RF module 829 may further include components for transmitting/receiving electromagnetic waves on a free space in a wireless communication, for example, conductors or conducting wires. Although the cellular module 821, the Wifi module 823, the BT module 825, the GPS module 827, and the NFC module 828 share one RF module 829 shown in FIG. 8, according to embodiments of the present disclosure, at least one of the cellular module 821, the Wifi module 823, the BT module 825, the GPS module 827, and the NFC module 828 may perform the transmission of an RF signal through an additional RF module.

The SIM card 824 may be a card including a subscriber identification module and may be inserted into a slot formed at a specific position of an electronic device. The SIM card 824 may include unique identification information (for example, an integrated circuit card identifier (ICCID)) or subscriber information (for example, an international mobile subscriber identity (IMSI)).

The memory 830, for example, the storage unit 160 of FIG. 1, may include an internal memory 832 or an external memory 834. The internal memory 832 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory).

According to embodiments of the present disclosure, the internal memory 832 may be a Solid State Drive (SSD). The external memory 834 may further include flash drive, for example, compact flash (CF), secure digital (SD), micro secure digital (Micro-SD), mini secure digital (Mini-SD), extreme digital (xD), or memorystick. The external memory 834 may be functionally connected to the electronic device 800 through various interfaces. According to embodiments of the present disclosure, the electronic device 800 may further include a storage device (or a storage medium) such as a hard drive.

The sensor module 840 measures physical quantities or detects an operating state of the electronic device 800, thereby converting the measured or detected information into electrical signals. The sensor module 840 may include at least one of a gesture sensor 840A, a gyro sensor 840B, a pressure sensor 840C, a magnetic sensor 840D, an acceleration sensor 840E, a grip sensor 840F, a proximity sensor 840G, a color sensor 840H (for example, a red, green, blue (RGB) sensor), a bio sensor 840I, a temperature/humidity sensor 840J, an illumination sensor 840K, and an ultra violet (UV) sensor 840M. Additionally/alternately, the sensor module 840 may include an E-nose sensor (not shown), an electromyography (EMG) sensor, an electroencephalogram (EEG) sensor (not shown), an electrocardiogram (ECG) sensor (not shown), an infra red (IR) sensor (not shown), an iris sensor (not shown), or a fingerprint sensor (not shown). The sensor module 840 may further include a control circuit for controlling at least one sensor therein.

The input module 850, for example, the input unit 120 of FIG. 1, may include a touch panel 852, a (digital) pen sensor 854, a key 856, or an ultrasonic input device 858. The touch panel 852 (for example, the display unit 150) may recognize a touch input through at least one of capacitive, resistive, infrared, or ultrasonic methods, for example. Additionally, the touch panel 852 may further include a control circuit. In the case of the capacitive method, both direct touch and proximity recognition are possible. The touch panel 852 may further include a tactile layer. In this case, the touch panel 852 may provide a tactile response to a user.

The (digital) pen sensor 854 may be implemented through a method similar or identical to that of receiving a user's touch input or an additional sheet for recognition. The key 856 (for example, the input unit 120) may include a physical button, a touch key, an optical key, or a keypad, for example. The ultrasonic input device 858, as a device checking data by detecting sound waves through a microphone in the electronic device 800, may provide wireless recognition through an input tool generating ultrasonic signals. According to embodiments of the present disclosure, the electronic device 800 may receive a user input from an external device (for example, a computer or a server) connected to the electronic device 800 through the communication module 820.

The display 860, for example, the display unit 150 of FIG. 1, may include a panel 862, a hologram device 864, or a projector 866. The panel 862, for example, may include a liquid-crystal display (LCD) or an active-matrix organic light-emitting diode (AM-OLED). The panel 862 may be implemented to be flexible, transparent, or wearable, for example. The panel 862 and the touch panel 852 may be configured with one module. The hologram 864 may show three-dimensional images in the air by using the interference of light. The projector 866 may display an image by projecting light on a screen. The screen, for example, may be placed inside or outside the electronic device 800. According to embodiments of the present disclosure, the display 860 may further include a control circuit for controlling the panel 862, the hologram device 864, or the projector 866.

The interface 870 may include a high-definition multimedia interface (HDMI) 872, a universal serial bus (USB) 874, an optical interface 876, or a D-subminiature (sub) 878, for example. Additionally/alternately, the interface 870 may include a mobile high-definition link (MHL) interface, a secure Digital (SD) card/multi-media card (MMC) interface, or an infrared data association (IrDA) standard interface.

The audio module 880, for example, the audio processing unit 130 of FIG. 1, may convert sound and electrical signals in both directions. The audio module 880 may process sound information inputted/outputted through a speaker 882, a receiver 884, an earphone 886, or a microphone 888.

The camera module 891 (for example, the camera unit 140 of FIG. 1), as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 895 may manage the power of the electronic device 800. Although not shown in the drawings, the power management module 895 may include a power management integrated circuit (PMIC), a charger integrated circuit (IC), or a battery or fuel gauge, for example.

The PMIC may be built in an IC or SoC semiconductor, for example. A charging method may be classified as a wired method and a wireless method. The charger IC may charge a battery and may prevent overvoltage or overcurrent flow from a charger. According to embodiments of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 896, or a voltage, current, or temperature of the battery 896 during charging. The battery 896 may store or generate electricity and may supply power to the electronic device 800 by using the stored or generated electricity. The battery 896, for example, may include a rechargeable battery or a solar battery.

The indicator 897 may display a specific state of the electronic device 800 or part thereof (for example, the AP 810), for example, a booting state, a message state, or a charging state. The motor 898 may convert electrical signals into mechanical vibration. Although not shown in the drawings, the electronic device 800 may include a processing device (for example, a GPU) for mobile TV support. A processing device for mobile TV support may process media data according to the standards such as digital multimedia broadcasting (DMB), digital video broadcasting (DVB), or media flow.

As mentioned above, according to various embodiments of the present disclosure, a recording support electronic device and method perform recording multimedia data on the basis of a component of language checked from voice data included in the multimedia data. Therefore, an inconvenience in separately searching for a desired portion from a recording file may be eliminated.

Additionally, according to various embodiments of this disclosure, a recording support electronic device and method record multimedia data including voice data on the basis of a component of language and convert the voice data into text data and output it. Therefore, the voice data may be provided to a user as text data.

Additionally, according to various embodiments of the disclosure, a recording support electronic device and method translate first text data for a first language into second text data for a second language, and output the second text data by using timestamp information. Therefore, a synchronization between voice data and text data may be performed easily using the timestamp information.

Each of the above-mentioned components of the electronic device according to various embodiments of the present disclosure may be configured with at least one component and the name of a corresponding component may vary according to the kind of an electronic device. An electronic device according to embodiments of the present disclosure may be configured including at least one of the above-mentioned components or additional other components. Additionally, some components of an electronic device according to embodiments of the present disclosure are combined and configured as one entity, so that functions of previous corresponding components are performed identically.

The term "module" used in this disclosure, for example, may mean a unit including a combination of at least one of hardware, software, and firmware. The term "module" and the term "unit", "logic", "logical block", "component", or "circuit" may be interchangeably used. "module" may be a minimum unit or part of an integrally configured component. "module" may be a minimum unit performing at least one function or part thereof. "module" may be implemented mechanically or electronically. For example, "module" used in this disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor executes an instruction, it may perform a function corresponding to the instruction. The computer-readable storage media may be a memory, for example. At least part of a programming module may be implemented (for example, executed) by processor 810, for example. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction may include high-level language code executable by a computer using an interpreter in addition to machine code created by a complier. The hardware device may be configured to operate as at least one software module to perform an operation of this disclosure and vice versa.

A module of a programming module according to various embodiments may include at least one of the above-mentioned components or additional other components. Or, some programming modules may be omitted. Operations performed by a programming module or other components according to various embodiments of the present disclosure may be executed through a sequential, parallel, repetitive or heuristic method. Additionally, some operations may be executed in a different order or may be omitted. Or, other operations may be added.

Although the present disclosure has been described with embodiments, various changes and modifications may be suggested to one skilled in the art. It is intended that the present disclosure encompass such changes and modifications as fall within the scope of the appended claims.

What is claimed is:

1. An electronic device comprising:
an audio processing unit configured to receive audio data, and to acquire voice data from the audio data;
a control unit configured to receive or generate text data corresponding to the voice data, wherein the received or generated text data is in a language corresponding to the voice data, to extract a part of the voice data from the voice data by identifying a section in which voice is absent between the part of the voice data and another part of the voice data, to translate the received or generated text data into another text data for another language, and to store the part of the voice data and a part of the text data corresponding to the part of the voice data, wherein the part of the voice data and the part of the text data are associated each other, and wherein the part of the voice data comprises one or more units extracted from the voice data based on a component of a language; and
a display unit configured to output the received or generated text data.

2. The electronic device according to claim 1, wherein the one or more units comprises a voice data unit.

3. The electronic device according to claim 2, wherein the voice data unit comprises at least one of syllable, morpheme, word, phrase, and verse.

4. The electronic device according to claim 1, wherein the control unit is configured to identify timestamp information on the time at which a specific frequency waveform corresponding to the part of the voice starts and the time at which the specific frequency waveform ends.

5. The electronic device according to claim 4, wherein the control unit is configured to synchronize the part of the voice data and the part of the text data by using the identified timestamp information to store the part of the voice data and the part of the text data by associating each other.

6. The electronic device according to claim 4, wherein the control unit is configured to, when video data including the voice data is recorded:
identify each of timestamp information on start time and end time of the part of the voice data, and
synchronize the part of the voice data and the part of the video data corresponding to the part of the voice data.

7. The electronic device according to claim 1, wherein the of the part of the voice data and text data is stored in response to receiving a signal selecting the outputted received or generated text data.

8. The electronic device according to claim 1, wherein the part of the text data corresponding to the part of the voice data comprises: at least one text data unit, and
wherein the at least one text data unit includes at least one of a syllable, morpheme, word, phrase, and verse.

9. An electronic device comprising:
an audio processing unit configured to receive audio data, and to acquire voice data from the audio data;
a control unit configured to:
receive or generate text data corresponding to the voice data, wherein the received or generated text data is in a language corresponding to the voice data,
translate the received or generated text data into another text data for another language,
store a part of the voice data and a part of the text data corresponding to the part of the voice data, wherein the part of the voice data and the part of the text data are associated each other, and wherein the part of the voice data comprises one or more units,
extract the part of the voice data from the voice data by identifying a section in which voice is absent between the part of the voice and another part of the voice data, and
identify timestamp information on the time at which a specific frequency waveform corresponding to the part of the voice starts and the time at which the specific frequency waveform ends; and
a display unit configured to output the received or generated text data.

10. A recording support method comprising:
receiving audio data;
acquiring voice data from the audio data;
receiving or generating text data corresponding to the voice data, wherein the received or generated text data is in a language corresponding to the voice data;
extracting a part of the voice data from the voice data by identifying a section in which voice is absent between the part of the voice and another part of the voice data;
translating the received or generated text data into another text data for another language;
storing the part of the voice data and a part of the text data corresponding to the part of the voice data; and
output the received or generated text data, and
wherein the part of the voice data and the part of the text data are associated each other, and
wherein the part of the voice data comprises one or more units extracted from the voice data based on a component of language.

11. The method according to claim 10, wherein the one or more units comprises a voice data unit.

12. The method according to claim 11, wherein the voice data unit comprises at least one of syllable, morpheme, word, phrase, and verse.

13. The method according to claim 10, further comprising:
identifying timestamp information on a time at which a specific frequency waveform corresponding to the part of the voice starts and a time at which the specific frequency waveform ends.

14. The method according to claim 13, further comprising:
synchronizing the part of the voice data and the part of the text data by using the identified timestamp information to store the part of the voice data and the part of the text data by associating each other.

15. The method according to claim 13, further comprising, when video data including the voice data is recorded:
identifying each of timestamp information on start time and end time of the part of the voice data, and
synchronizing the part of the voice data and the part of the video data corresponding to the part of the voice data.

16. The method according to claim 10, wherein the storing of the part of the voice data and the part of the text data is performed in response to receiving a signal selecting the outputted received or generated text data.

17. The method according to claim 10, wherein the part of the text data corresponding to the part of the voice data comprises: at least one text data unit, and
wherein the at least one text data unit includes at least one of a syllable, morpheme, word, phrase, and verse.

* * * * *